(12) United States Patent
Cottrell et al.

(10) Patent No.: US 6,476,956 B1
(45) Date of Patent: Nov. 5, 2002

(54) FAST OPTICAL MODULATOR

(75) Inventors: William J. Cottrell, Essex Junction, VT (US); Thomas G. Ference, Essex Junction, VT (US); Kenneth A. Puzey, Essex Junction, VT (US)

(73) Assignee: TeraComm Research, Inc., Essex Junction, VT (US)

( * ) Notice: Subject to any disclaimer, the term of this patent is extended or adjusted under 35 U.S.C. 154(b) by 59 days.

(21) Appl. No.: 09/796,026

(22) Filed: Feb. 28, 2001

(51) Int. Cl.$^7$ .............. G02F 1/09; G02F 1/00; G02F 1/03
(52) U.S. Cl. .......... 359/280; 359/281; 359/237; 359/245
(58) Field of Search .............. 359/237, 238, 359/239, 245, 246, 248, 264, 280, 281; 385/2, 6, 8, 4; 356/345; 250/227.27, 227.19; 324/96; 428/692, 700

(56) References Cited

U.S. PATENT DOCUMENTS

| | | | |
|---|---|---|---|
| 3,663,957 A | * 5/1972 | Mollenbeck et al. | 324/96 |
| 4,563,639 A | * 1/1986 | Langeac | 324/96 |
| 4,947,107 A | * 8/1990 | Doerfler et al. | 324/96 |
| 5,502,585 A | 3/1996 | Qian | 359/108 |
| 5,502,781 A | * 3/1996 | Li et al. | 385/4 |
| 5,768,002 A | 6/1998 | Puzey | 359/245 |
| 5,871,856 A | * 2/1999 | Kumatoriya et al. | 428/700 |
| 5,889,609 A | 3/1999 | Fukushima | 359/280 |
| 6,043,515 A | 3/2000 | Kamiguchi et al. | 257/103 |
| 6,194,091 B1 | * 2/2001 | Fujino | 428/692 |

OTHER PUBLICATIONS

Roman Sobolewski et al, "Magneto–Optical Modulator for Superconducting Digital Output Interface," paper presented at the Applied Superconducting Conference held Sep. 17–22, 2000.

J. J. Baumberg et al, "Femtosecond Faraday rotation in spin–engineered heterostructures," J. Appl. Phys. 75 (10), May 15, 1994 ("the Baumberg paper").

(List continued on next page.)

*Primary Examiner*—Georgia Epps
*Assistant Examiner*—Gary O'Neill
(74) *Attorney, Agent, or Firm*—James M. Leas

(57) ABSTRACT

A short pulse of radiation is generated by shining radiation through a magneto-optical material. The material is excited twice to rapidly change a property of the wave, such as the direction of the polarization. The first excitation rotates the polarization in a first direction and the second excitation brings the polarization back to its initial direction before the first excitation. Although the time for relaxation from the excitations may be lengthy, a pulse of light can be produced that is shorter in time than the time for excitation plus the time for relaxation. Light experiencing the pair of lengthy relaxations has each cancelling the effect of the other. The pulse of light has a length that depends on the time difference between the two excitations and the spacing between them. The rapid excitations are provided by pulses of current in a superconductor located near the magneto-optical material.

53 Claims, 13 Drawing Sheets

OTHER PUBLICATIONS

A. Y. Elazzabi and M. R. Freeman, "Ultrafast magneto–optic sampling of picosecond current pulses," Appl. Phys. Lett. 68 (25) Jun. 17, 1996.

M. A. Butler et al, "Frequency–dependent Faraday rotation in CdMnTe," Appl. Phys. Lett. 49 (17), Oct. 27, 1986.

*CRC Handbook of Chemistry and Physics*, $80^{th}$ edition, pp. 12–161 to 12–167.

Handbook of Optics, edited by Michael Bass et al, McGraw–Hill, 1995.

R. Adam et al, "Experiments and Simulations of Subpicosecond SFQ Propagation in Y–Ba–Cu–O Josephson Transmission Lines," Pre–Conference abstract of presentation at the IEEE Applied Superconductivity Conference, Sep. 17–22, 2000, Virginia Beach, Virginia.

R. Adam et al, "Direct Observation of Subpicosecond Single–Flux–Quantum Generation in Pulse–Driven Y–Ba–Cu–O Josephson Junctions," Applied Physics Letters, vol. 76, No. 4, Jan. 24, 2000, p. 469–471.

\* cited by examiner

FAST OPTICAL MODULATOR

FIELD OF THE INVENTION

This invention generally relates to optical modulation. More particularly, it relates to a device for high data rate modulation of an optical signal. Even more particularly, the invention relates to a device that provides a high data rate of magneto-optical modulation.

BACKGROUND OF THE INVENTION

Because of the high data rates available, optical fiber is preferred for high-speed transmission of data, audio, and video. Binary optical signals consist of low and high to intensity signals traveling through the fiber. A limiting factor in optical fiber communication networks has been the speed at which light can be electrically switched or modulated to provide change from a high intensity signal to a low intensity signal and back to a high intensity signal. This conversion from electrical to optical signal is slower than the capability of the fiber. While the optical fiber can accommodate much higher data rates, commercial techniques for creating high-speed modulation are presently achieving approximately 40 billion bits per second, or 40 GHz.

One method of modulating an optical signal involves providing a digital optical signal directly from a light source. In this method light is directly modulated by turning on and turning off power to a laser source. It is difficult, however, to make these transitions quickly without introducing non-linear effects that can degrade the signal. These effects include changes in index of refraction of material in the laser cavity which effectively changes the optical path length of the cavity during the pulse, leading to an effect called chirp, and provides greater dispersion of the signal as it travels down optical fiber.

Alternatively, a continuous wave light source can be externally modulated to provide a digital optical signal. One such method is electroabsorption modulation. Continuous wave light is directed through a semiconductor. When current flows in the semiconductor, enough electrons are moved from valence to conduction band to provide a population inversion. Light traveling through the semiconductor with the population inversion is amplified by stimulated emission. On the other hand, when no electric current flows, electrons move back to the valence band. Now the light is absorbed by the low energy electrons, so the light intensity is diminished as it travels through the semiconductor. The substantial difference in light intensity when current is flowing and when current is not flowing provides the on and off signals. However, this scheme is limited by the time for generation and relaxation of excited states in the semiconductor.

A third method, a Mach-Zehnder modulator, provides another external modulation technique in which a light beam traveling in a waveguide is split into two paths and then recombined into a single path where the two beams interfere. A material is provided along one path that has a refractive index sensitive to applied voltage. The change in phase introduced by the changing voltage applied to the material provides for constructive or destructive interference where the signals recombine. Currently, however, 10–15V is needed to provide the phase shift, and it has been difficult to provide high frequency signals at a high voltage to drive the phase modulator.

An alternative approach to increase the amount of data that can be transmitted through an optical fiber is Dense Wave Division Multiplexing (DWDM), in which many individual signals, each with a slightly different wavelength, are transmitted through a single optical fiber at one time. Each of the dozens of signals in the fiber runs at the 40 GHz data rate, providing a substantially higher overall data rate. While DWDM increases the data rate provided by a fiber, the equipment cost for transmission capacity is higher for DWDM than for faster modulators. Also, errors may be introduced into the data as a result of a process known as four wave mixing, in which photons of different wavelengths in a fiber combine, so data is lost in two channels in the fiber. Two other photons are generated at different wavelengths, and these may contribute to noise and errors in other channels in the fiber. Thus, faster modulation for each wavelength is desirable.

Two additional techniques to greatly increase modulation frequency and increase the data rate for transmission in a fiber have been proposed in commonly assigned U.S. Pat. No. 5,768,002 to K. A. Puzey, and in a paper "Magneto-Optical Modulator for Superconducting Digital Output Interface," by Roman Sobolewski, et al, given at the Applied Superconducting Conference held Sep. 17–22, 2000 ("the Sobolewski paper"). Superconductors allow low voltage high speed current switching.

The Puzey technique rapidly switches a superconducting film between superconducting and non-superconducting states and takes advantage of the difference in optical properties of the material in the two states. In the superconducting state, more far-infrared light is reflected from the material, while in the non-superconducting state, more is transmitted. Continuous wave far-infrared light is modulated by an electrical signal provided to such a superconducting film. After modulation of this far-infrared light, the signal is then parametrically converted to a shorter wavelength in the near-infrared range for transmission in a standard optical fiber. Well known frequency up-conversion nonlinear optics are used for the conversion.

The technique described in the Sobolewski paper stimulates magneto-optic material 10, such as europium monochalcogenides (EuS, EuTe, EuO, and EuSe) by providing magnetic field 12 from current pulse 14 in adjacent superconducting signal electrode 16 driven by a Josephson junction, as shown in FIGS. 1a, 1b. Continuous light wave 18 is coupled into magneto-optic material 10 through fiber optic input 19a and exits through fiber optic output 19b. Portion of light wave 18 traveling in magneto-optical material 10 in magnetic field 12 has its polarization rotated, a property known as the Faraday effect. An interferometer is used to provide pulses of light based on this rotation of the polarization. Because the excitation of magneto-optical materials occurs in a time measured in pico-seconds, as shown in FIG. 2a from a paper, "Femtosecond Faraday rotation in spin-engineered heterostructures," by J. J. Baumberg, et al, J. Appl. Phys. 75 (10), May 15, 1994 ("the Baumberg paper"), early investigators recognized that such magneto-optical microstriplines might provide a way to modulate signals in the THz (trillion bits per second) range, about two orders of magnitude higher than present modulation.

The curves in the Baumberg paper, however, show a problem with the slow relaxation from the excited state that limits the overall transition time. The relaxation time of magneto-optical materials from their excited state back to ground state can be much longer than the time for excitation, as also shown in FIG. 2a from the Baumberg paper. Thus, there is a very fast excitation rate, on the order of one picosecond, for Faraday rotation in an applied magnetic field for a heterostructure. There is also a slow exponential relaxation rate extending over 250 ps. The slow relaxation limits the speed at which a magneto-optical material can operate as an optical modulator. No way to avoid the slow relaxation has been demonstrated. This lengthy relaxation time substantially limits the speed of operation of such devices as compared to the promise of the much more rapid excitation.

Similarly, in a paper, "Ultrafast magneto-optic sampling of picosecond current pulses, " by A. Y. Elazzabi and M. R. Freeman, Appl. Phys. Lett. 68 (25) Jun. 17, 1996, data is presented showing current pulses having a rise time of 15 ps and an exponential fall time of 250 ps obtained by triggering a photoconductive switch with an ultrashort laser pulse. The current pulse is used to change the refractive index of a Bi-substituted yttrium-iron-garnet ferromagnetic film, and this causes a rotation in the plane of polarization of polarized light due to the magneto-optic Kerr or Faraday effect in the ferromagnetic film. The technique allowed a bandwidth of 82 GHz to be achieved.

In a paper, "Frequency-dependent Faraday rotation in CdMnTe," by M. A. Butler, et al, Appl. Phys. Lett. 49 (17), Oct. 27, 1986, data showing a large optical Faraday rotation as a function of the frequency of an applied magnetic field is presented for two compositions of the dilute magnetic semiconductor, CdMnTe. Faraday rotation was observed at frequencies up to about 5 GHz in small magnetic fields. This material has a very high response to magnetic excitation (a high Verdet constant), and it has a relaxation time constant on the order of 100 ps.

Although a number of authors have suggested advantages to modulating light based on magneto-optical materials, none suggest a scheme to overcome the limitation on data rate provided by the slow relaxation of the magneto-optical materials. Thus, a better system for more rapidly converting an electrical signal to an optical signal is needed, and this solution is provided by the following invention.

SUMMARY OF THE INVENTION

It is therefore an object of the present invention to provide a scheme for rapidly modulating an optical signal;

It is a further object of the present invention to provide a scheme for rapidly rotating polarization of an optical signal while eliminating a slow relaxation of the polarization;

It is a further object of the present invention to provide that delay associated with relaxation from an excited state of the magneto-optical material does not affect data rate;

It is a further object of the present invention to provide rapid changes between two states in a magneto-optical material to provide the rapid modulation of the optical signal traveling through the magneto-optical material;

It is a further object of the present invention to provide stimulations to the magneto-optical material for the transition in each direction so relaxation time does not limit the data rate;

It is a feature of the present invention that two rotations of the plane of polarization of light are provided by stimulating the magneto-optical material twice;

It is a feature of the present invention that two rotations of the plane of polarization of light are provided by stimulating the magneto-optical material with a single current pulse crossing the material twice;

It is a feature of the present invention that a superconductor is used to couple a current pulse which induces a magnetic pulse stimulation to the magneto-optical material;

It is an advantage of the present invention that a linear combination of two high speed stimulations to the magneto-optical material rotates the polarization back to its original direction while the effect of the two slow relaxation times on the light cancel each other out; and It is an advantage of the present invention that the optical modulating is at a much higher data rate than is otherwise achievable.

These and other objects, features, and advantages of the invention are accomplished by a method of generating an electromagnetic pulse comprising the step of directing incident radiation through a material. The radiation has a first parameter. A first stimulation is provided to a first region of the material to excite a first population of the material into a first excited state. The material has a time for excitation and a time for relaxation after said excitation. From the incident radiation a pulse of electromagnetic radiation is generated in the material in which the pulse is shorter in time than time for the excitation plus the time for relaxation of the material.

Electromagnetic radiation traveling through the first region stimulated in the first excited state and radiation traveling through the second region stimulated in the second excited state are combined. The first parameter of the combined radiation comprises a linear combination of the first amount and the second amount. The linear combination of the first amount and the second amount provides the first parameter with a value approximately equivalent to that of the initial radiation. The first region of the material can be in a first leg of a Mach-Zehnder interferometer and the second region of the material in a second leg of the Mach-Zehnder interferometer. Alternatively, the first region of the material can be in line with the second region of the material, wherein radiation traveling through the first region stimulated in the first excited state also travels through the second region stimulated in the second excited state.

The second amount is set to be about equal and opposite the first amount so that slow relaxations cancel each other out.

The pulse includes a first part and a second part. The first part includes radiation traveling through the first region stimulated in the first excited state but not through the second region stimulated in the second excited state. The second part includes radiation traveling through the first region stimulated in the first excited state and radiation traveling through the second region stimulated in the second excited state.

The first parameter can be polarization, wherein the incident radiation has an incident polarization. The incident radiation traveling through the first region stimulated in the first excited state has the incident polarization rotated a first amount in a first direction. The radiation traveling through the second region stimulated in the second excited state has its polarization rotated a second amount in a second direction. The second part of the pulse includes radiation having a polarization rotated back to that of the incident radiation.

Another aspect of the invention is a device comprising an electrical conductor and a magneto-optical material. The electrical conductor crosses the magneto-optical material in a first location and in a second location. The electrical conductor is positioned to provide a first current pulse stimulating a first excitation of a first population of said magneto-optical material at the first location. The electrical conductor is positioned to provide a second current pulse stimulating a second excitation of a second population of the magneto-optical material at the second location. The electrical conductor and the magneto-optical material are configured to provide the second excitation of the second population to be opposite the first excitation of the first population.

Another aspect of the invention is a method of making an optical signal comprising the step of providing a material. Incident radiation is directed at the material. The incident radiation includes a first parameter having an initial value. The incident radiation also includes a first segment of the wave. A first stimulation is provided to the material to provide a first change to the first parameter in the first segment of the wave. A second stimulation is provided to the material to provide a second change to the first parameter in the first segment of the wave.

Another aspect of the invention is a circuit comprising a first superconductor, a second superconductor, and a source of a high frequency signal. The source has a frequency sufficient to provide resistance in the first superconductors and in the second superconductor for dividing the signal according to the resistance in each superconductor.

BRIEF DESCRIPTION OF THE DRAWINGS

The foregoing and other objects, features, and advantages of the invention will be apparent from the following detailed description of the invention, as illustrated in the accompanying drawings, in which.

DETAILED DESCRIPTION OF THE INVENTION

Figure 1A:
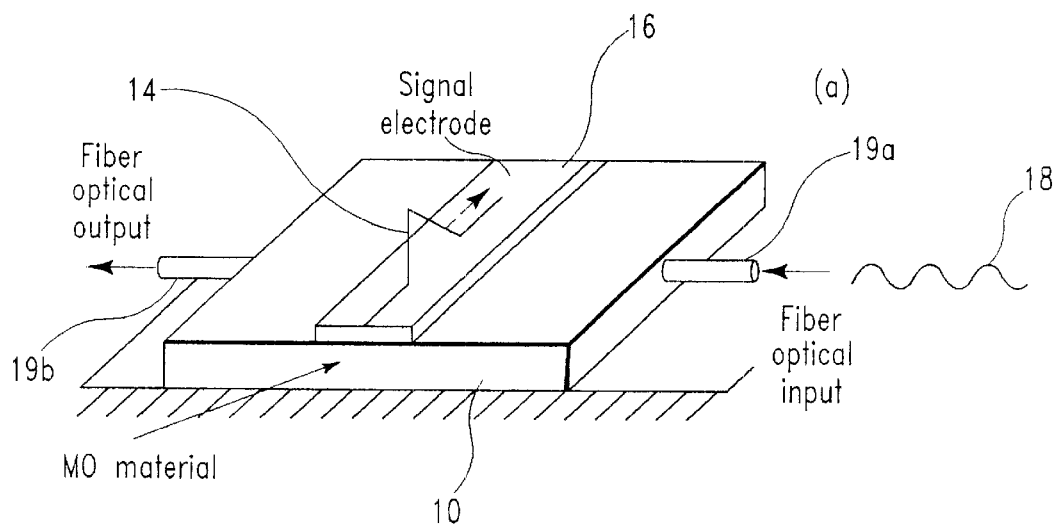
FIG. 1a is a top view of a magneto-optical waveguide of the prior art crossed by a signal electrode carrying a pulse of current for generating a magnetic field.
Figure 1B:
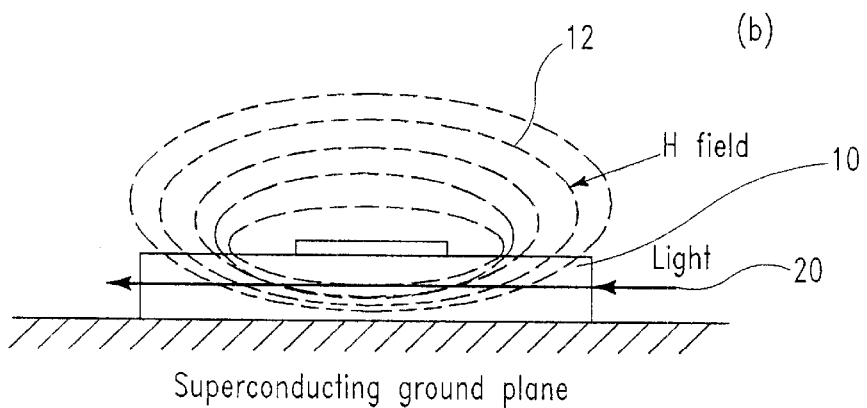
FIG. 1b is a cross sectional view of the magneto-optical waveguide of FIG. 1a showing the magnetic field generated by the current pulse extending parallel to the direction of light propagation in the magneto-optical waveguide.
Figure 2A:
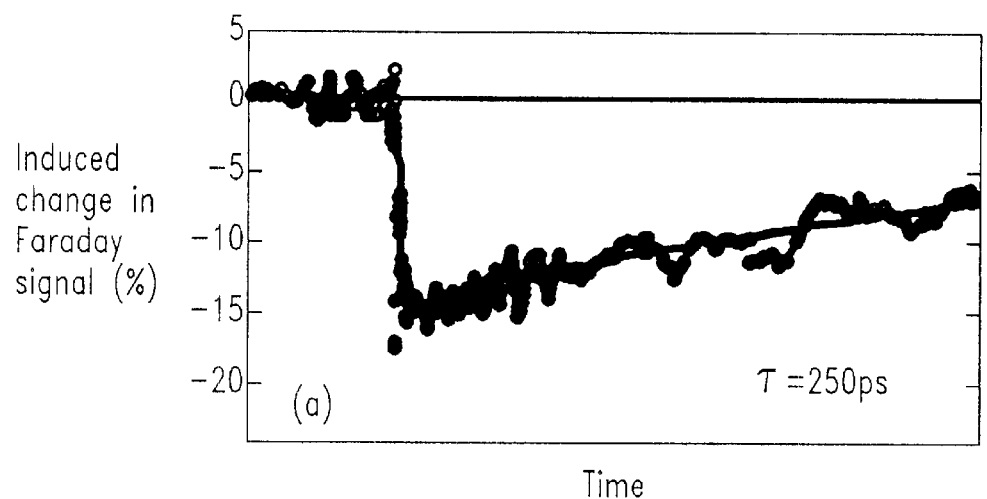
FIG. 2a illustrates the fast excitation and the slow relaxation of a magneto-optical material as reported in the prior art.

Magneto-optical materials transition from an initial state to an excited state very rapidly in response to a rapid magnetic field stimulation but the time for relaxation back to the ground state is longer. For example, Baumberg found that the time for relaxation was two orders of magnitude longer than the time for excitation, as shown in FIG. 2a. The excitation portion of the curve is almost vertical and time for this excitation appears to be on the order of one picosecond or less. Relaxation is gradual, taking about 250 ps. The present inventors recognized the potential offered by the very fast transition in one direction. They also recognized that the speed of modulation light to provide a high data rate in magneto-optical materials is limited by the relatively long time for the material to return to ground state from the excited state. The present inventors found a way to use the very fast excitation while overcoming the problem of slow relaxation. The result is substantially higher speed modulation than would otherwise be achieved.

In brief, the invention provides two closely spaced rapid magnetic stimulations to the material to excite two populations of the material. Generally, the second stimulation is oppositely directed to the first stimulation so it has a counter effect on the light as the first. The time between the two stimulations and their physical spacing defines the width of the pulse of light that emerges. The inventors recognized that the effect of the oppositely directed second lengthy relaxation on the light can cancel the effect of the first lengthy relaxation. The result is a light pulse having a time based on the time between the two rapid excitations and their physical spacing. And the inventors recognized that a large number of such pulses could be packed into the time normally spent waiting for the slow relaxation. Thus, the inventors provided light pulses at very high data rate, far higher than could otherwise be provided with the long relaxation time of the magneto-optical material.

Figure 3A:
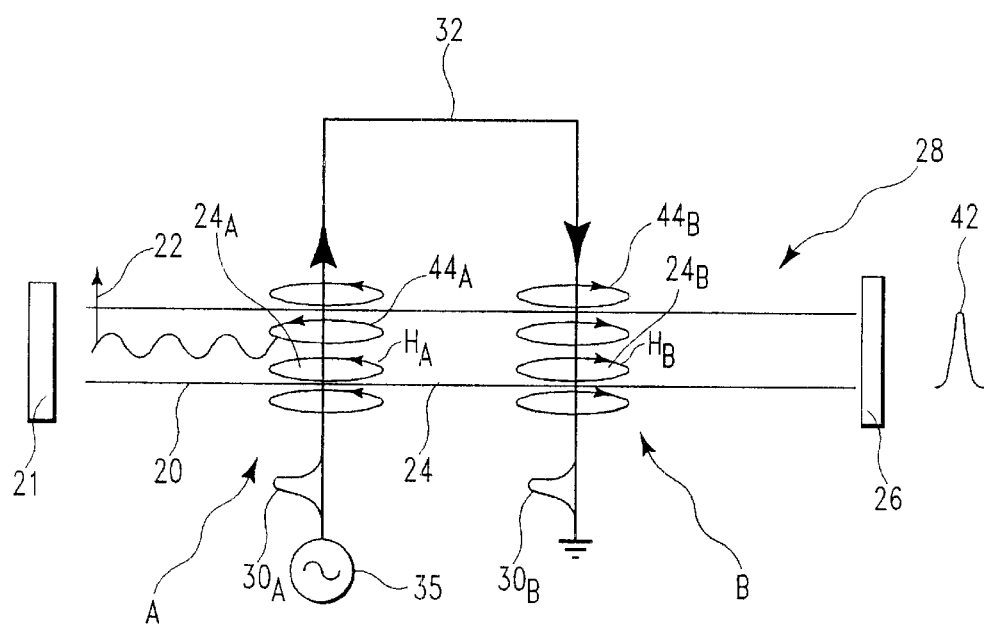
FIG. 3a is a top view of a magneto-optical waveguide crossed twice by an electrical conductor carrying a pulse of current to provide magnetic fields for providing two rapid stimulations of the magneto-optical waveguide for providing two rapid rotations of the plane of polarization of light traveling through the waveguide.
Figure 4:
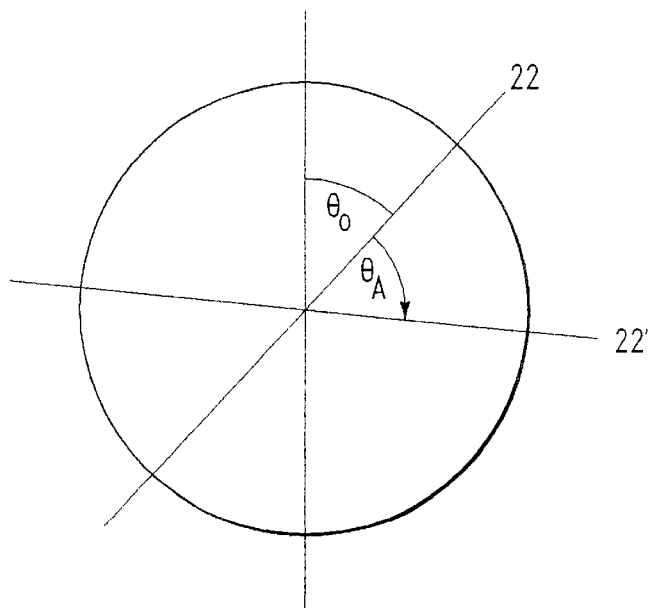
FIG. 4 is a diagram showing a change in angle of the plane of polarization of a wave traveling through the magneto-optical waveguide after the pulse of current makes its first traversal across the waveguide.

The invention involves a conductor twice crossing a magneto-optical material, as shown in FIGS. 3a. In the invention, continuous light wave 20 passing through polarizer 21 has polarization 22 pointing in initial direction $\theta_o$, is directed through magneto-optical material 24, as shown in FIG. 3a and FIG. 4. Magneto-optical material 24 can include Cd, Mn, Se, Eu, O, S, Bi, C, K, Mg, Al, Br, Te, Cr, Fe, Ba, Y, Gd, Ga, I, Cl, Ni, Rb, Zn, Rh, Co, or Li. Magneto-optical materials include the materials described in the Sobolewski paper, and europium monochalcogenides (EuS, EuTe, EuO, and EuSe). Well known magneto-optical materials include EuS, $CrBr_3$, terbium gallium garnet, EuO, EuSe, $Y_3Fe_5O_{12}$, $CrCl_3$, $Cd_{0.55}Mn_{0.145}Te$, and $Tb_2Al_5O_{12}$. Many other magneto-optical materials, such as those listed in the *CRC Handbook of Chemistry and Physics*, $80^{th}$ edition, pages 12–161 to 12–167 can also be used.

Figure 12:
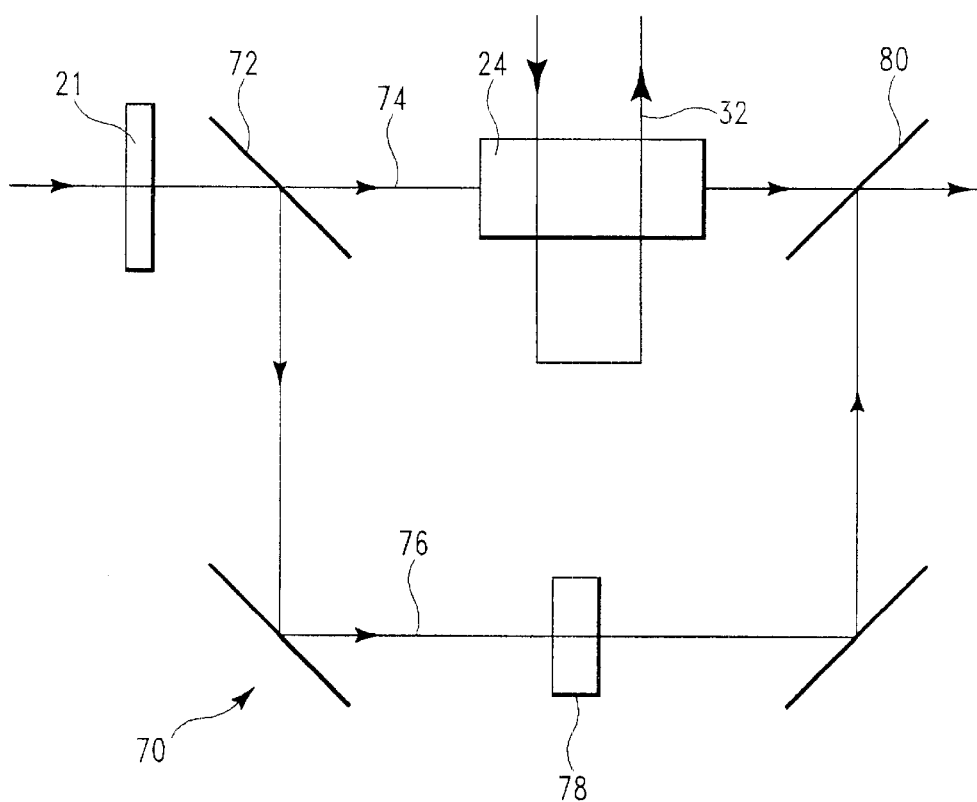
FIG. 12 shows an alternate arrangement using an interferometer instead of a polarizer.

Light wave 20 may be generated by a source that provides polarized light, such as a laser, in which case polarizer 21 may be omitted. Light wave 20 can be plane polarized, circularly polarized, or elliptically polarized. Polarizer 26 is oriented perpendicular to polarizer 21 to prevent light with this initial polarization 22 from being transmitted through polarizer 26, and then into optical fiber for further transmission through an optical network (not shown). This non-transmission provides the off-region of the digital optical signal that will be developed in magneto-optical material 24. Thus, optical system 28 is set up so no light is transmitted absent some stimulation of magneto-optical waveguide 24 to rotate plane of polarization 22 of light wave 20 so the light can pass through polarizer 26. Although a polarizer 26 is shown for simplicity, an interferometer configuration can be used instead, as shown in FIG. 12, and as further described herein below. Alternatively, the polarizers can be configured so they are aligned and transmit all incident radiation. Then the stimulation of the magneto-optical material provides a pulse of radiation with reduced intensity.

Figure 5A:
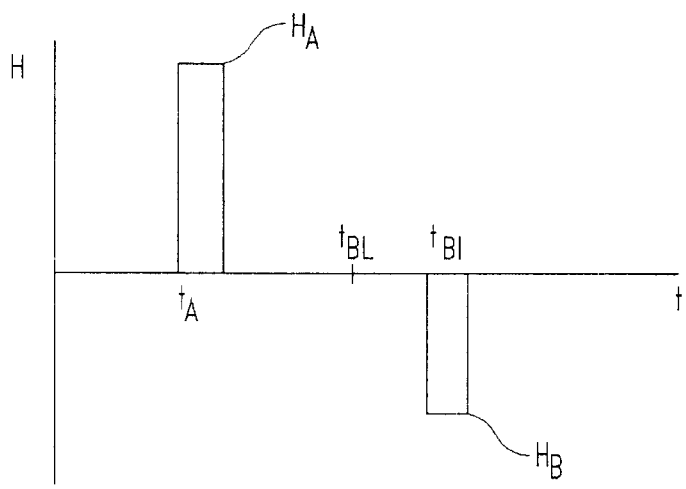
FIG. 5a is a graph showing magnetic field as a function of time from the two current pulses that travel across the magneto-optical waveguide, showing the first magnetic field pulse at time $t_A$ and the second magnetic field pulse at time $t_{BI}$.
Figure 5B:
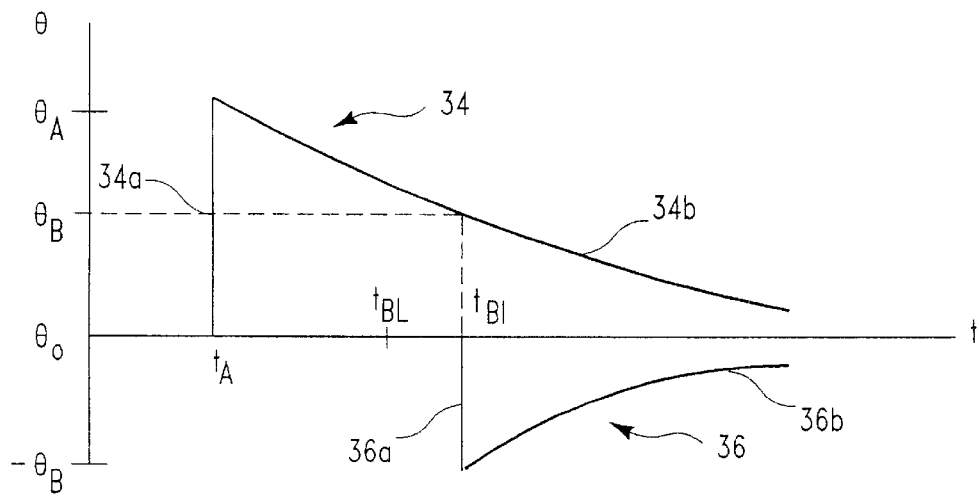
FIG. 5b is a graph showing the two fast rotations from the two rapid excitations of the magneto-optical material and the two slow rotations from the two slow relaxations of the magneto-optical material in which the second rotation is in an opposite direction to the first rotation.

The on-region of the digital optical signal is provided by a first rapid magnetic stimulation $H_A$ of first region $24_A$ of magneto-optical material 24, as shown in FIG. 3a and in idealized form in FIG. 5a. The excitation of a first population of magneto-optical material in first region $24_A$ causes light wave 20 traveling through first region $24_A$ to have the direction of its polarization 22 rotated through angle $\theta_A$ from initial direction $\theta_o$, as shown in FIGS. 4 and 5b, and as described in a book, Handbook of Optics, edited by Michael Bass, et al, McGraw-Hill, 1995. The stimulation can be an interband effect, an excitonic effect, an interband or free-carrier effect, or an impurity magneto absorption effect. This stimulation is provided by magnetic field $H_A$ induced by pulse of current $30_A$ traveling in conductor 32 across magneto-optical material 24 in region $24_A$. As Baumberg found (FIG. 2 and FIG. 5a), this excitation and the corresponding rotation of polarization 22 in light wave 20 is very rapid, as shown by the nearly vertical rise of portion 34a of rotation angle curve 34. Light wave 20 with rotated polarization 22' rotated at angle $\theta_A$ with respect to initial angle $\theta_o$ can now penetrate through polarizer 26 (or the interferometer shown in FIG. 12) and so a signal can be transmitted into the optical fiber. Because of the rotation of polarization 22', a significant intensity of light wave 20 can now pass through polarizing filter 26. This is the on-region of digital signal 42 shown by region 20b in FIG. 5c.

Figure 2B:
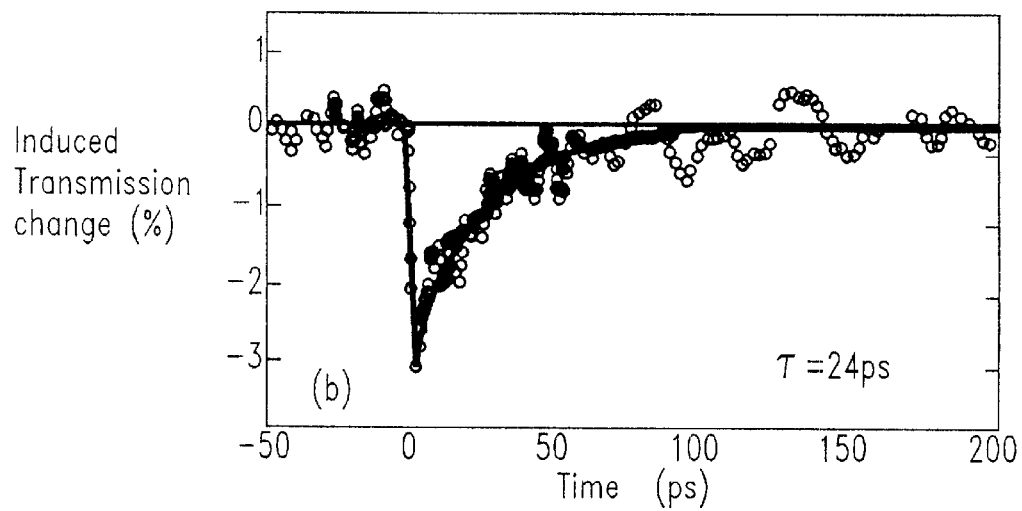
FIG. 2b illustrates the effect of the fast excitation and the slow relaxation of a magneto-optical material on light transmitted through a polarizer or interferometer, as reported in the prior art.

If left alone, relaxation of magneto-optical material 24 back to an unexcited state is relatively slow, as shown in FIG. 2a and by portion 34b of curve 34 in FIG. 5b, so light wave 20 with plane of polarization 22' rotated at an angle between angle $\theta_A$ and $\theta_o$ would continue to pass through filter 26 for a time about equal to the relaxation time. Material 24 gradually de-excites, plane of polarization gradually returns to $\theta_o$, and intensity of light wave 20 penetrating polarizer 26 decreases until intensity of light transmitted through polarizing filter 26 goes back to zero, as shown in FIG. 2a from the Baumberg paper and FIG. 5b. Since the intensity of light transmitted through a polarizer goes as the square of the sine of the angle between the polarization and the transmitting axis of the polarizer, the intensity of light falls substantially faster than relaxation of magneto-optical material 24, as shown in FIG. 2b. However, there is still a substantial time for this decline in intensity. The present invention provides a scheme in which data rate is governed by the brief time for the very rapid stimulation and is not reduced by the lengthy time for this gradual decline in intensity.

To provide that the on-signal has a very short duration uncoupled from the long relaxation time of the magneto-optical material, a second rapid magnetic stimulation $H_B$ is provided to a second population of magneto-optical material 24 in second region $24_B$, as shown as shown in FIGS. 3a and 5a. Second rapid magnetic stimulation $H_B$ is aimed in opposite direction to first stimulation provided by magnetic field $H_A$. This second stimulation is provided by current pulse $30_B$ returning across magneto-optical material 24 in region $24_B$ in opposite direction from current pulse $30_A$. The oppositely directed magnetic field $H_B$ that current pulse $30_B$ produces stimulates magneto-optical material 24 in region $24_B$. This stimulation causes light wave 20 traveling through second region $24_B$ to have the direction of its polarization rotated through angle $-\theta_B$ as shown with curve 36 in FIG. 5b, equal in magnitude to remaining rotation $\theta_B$ in region $24_A$ provided by first current pulse $30_A$. Like curve 34, curve 36 has rapid excitation portion 36a and slow relaxation portion 36b. The net effect of both stimulations is that a portion of light wave 20 has its polarization 22 experiencing both a rapid clockwise and a rapid counter clockwise rotation separated in time; the polarization of light wave 20 that experiences both rotations will point back in the initial direction $\theta_o$, and this light that experiences both rotations will again be blocked by polarizer 26 providing an off-region of digital signal 42, as shown by region 20c in FIG. 5c.

Figure 3B:
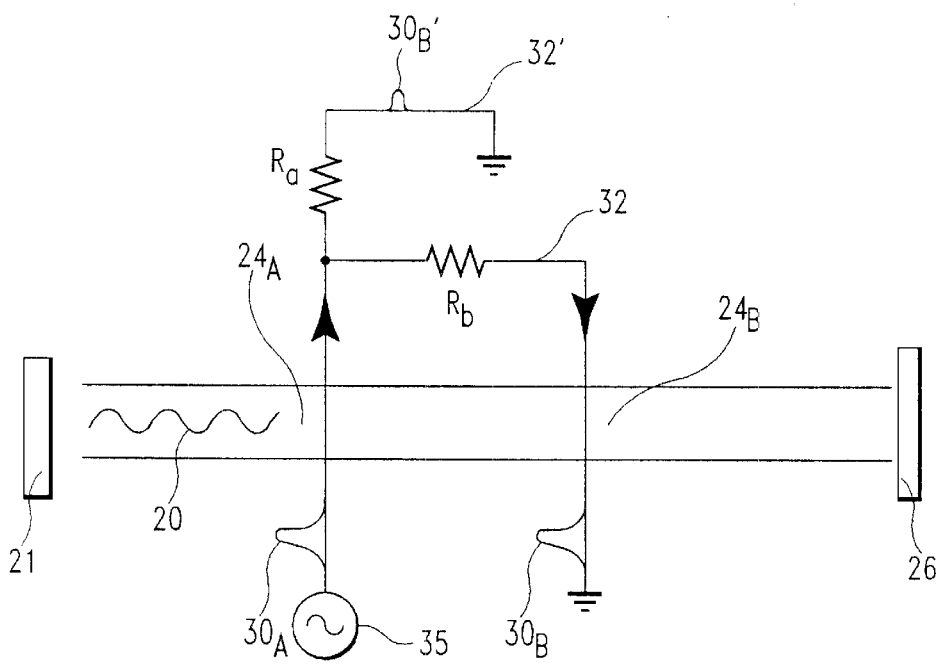
FIG. 3b is a top view of the magneto-optical waveguide of FIG. 3a including a current divider to tune the current pulse used for providing the second rapid stimulation so as to provide cancellation of light experiencing slow relaxation.

Amplitude of rotation of radiation may be appropriately adjusted by spacing electrical conductor 32 more distantly from second region $24_B$ than from first region $24_A$. The increased spacing can be achieved by providing a dielectric layer that is thicker in region $24_B$ than in region $24_A$. In the Mach-Zehnder embodiment, phase fine tuning or a variable attenuator can be provided in one leg to match signal from each leg and cancel effect of slow relaxation. In a single light path embodiment, parallel current path 32'can be provided, as shown in FIG. 3b, to bleed off portion $30_B$ ' of current pulse $30_B$ so remaining portion $30_B$ provides stimulation to more nearly match amplitude of rotation of light experiencing partially relaxed magneto-optical material in region $24_A$. Parallel path 32' may be a parallel superconducting path or it may have resistor Ra trimmed to properly make adjustment in current pulse $30_B$' to provide a matching rotation. At very high frequency superconductors 32', 32 both start to exhibit resistance. And these resistances can be used to provide Ra, Rb to adjust the division of current. Each resistance can be set by laser trimming dimensions of superconductor 32', 32.

Figure 5C:
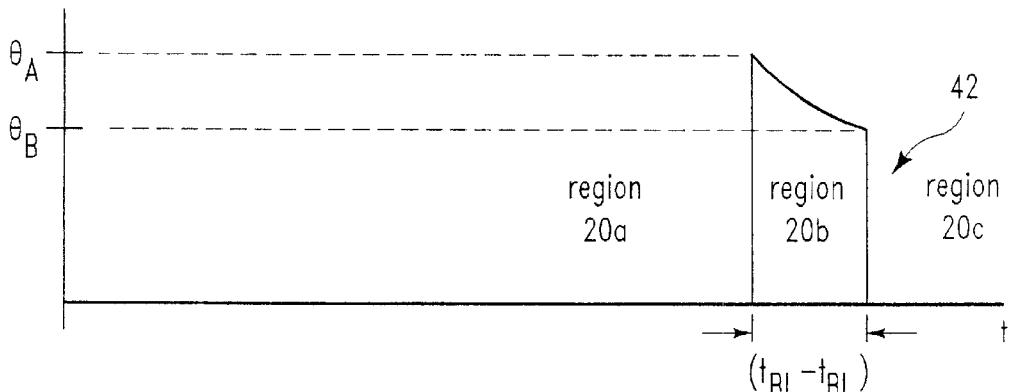
FIG. 5c is a graph showing the light pulse resulting from a linear combination of rotations in FIG. 5b.

In essence, light wave 20 experiences a linear combination of the two rapid excitations producing two rapid rotations 34a, 36a and the two slow relaxations producing two slow rotations back, 34b, 36b. First excitation $H_A$ rapidly rotates polarization 22 one way through angle $\theta_A$, as shown by portion 34a of curve 34, and light so rotated penetrates polarizer 26 to provide an on-signal in an optical fiber. Polarization angle of rotation immediately begins to relax, as shown by portion 34b of curve 34. However, soon after first excitation $H_A$, second excitation $H_B$ rapidly rotates polarization 22 the other way, as shown by portion 36a of curve 36. Just as this second excitation of magneto-optical material 24 provides a rotation of polarization 22 countering the effect of the first excitation, the effect of the first slow relaxation of material 24 on polarization 22 of light wave 20 is similarly reversed by the equal and opposite effect of the second slow relaxation. The two slow relaxations are about equal and opposite in magnitude, so their effects on light wave 20 passing through material 24 cancel, as shown in FIG. 5b. The result is that light wave pulse 42 emerges from polarizer 26 that is unaffected by the slow relaxation of magneto-optical material 24, as shown in FIG. 5c.

The length of time pulse 42 penetrates through polarizer 26 depends on time $t_A$ for first current pulse $30_A$ and first magnetic stimulation $H_A$ at location A in magneto-optical material 24 and time $t_{BI}$ for second current pulse $30_B$ and second magnetic stimulation $H_B$ at location B in magneto-optical material 24. It also depends on the time for light wave 20 that experiences the effects of current pulse $30_A$ to traverse the distance between location A and location B in magneto-optical material 24, $t_{BL}-t_A$. This time difference is $t_{BI}-t_{BL}$, as shown in FIG. 5a, and this is the time that current pulse 42 can penetrate polarizer 26, as shown in FIG. 5c. Rise times for the two stimulations also contribute to the time for pulse 42.

Pulse 42 is the only part of light wave 20 that has experienced only one rotation, and so this is the only part of light wave 20 that penetrates polarizer 26, providing the on-signal. Only for the brief time measured by the time for current pulse $30_A$ to traverse the wire between the two stimulation regions $24_A$, $24_B$ less the time for light to traverse that spacing can light penetrate polarizer 26. This pulse of light 42 is far shorter than the time for stimulation plus the time for relaxation of the magneto-optical material. Thus, the invention provides a pulse having a time that is much less than the time for excitation plus the time for relaxation of the magneto-optical material.

Figure 6A:
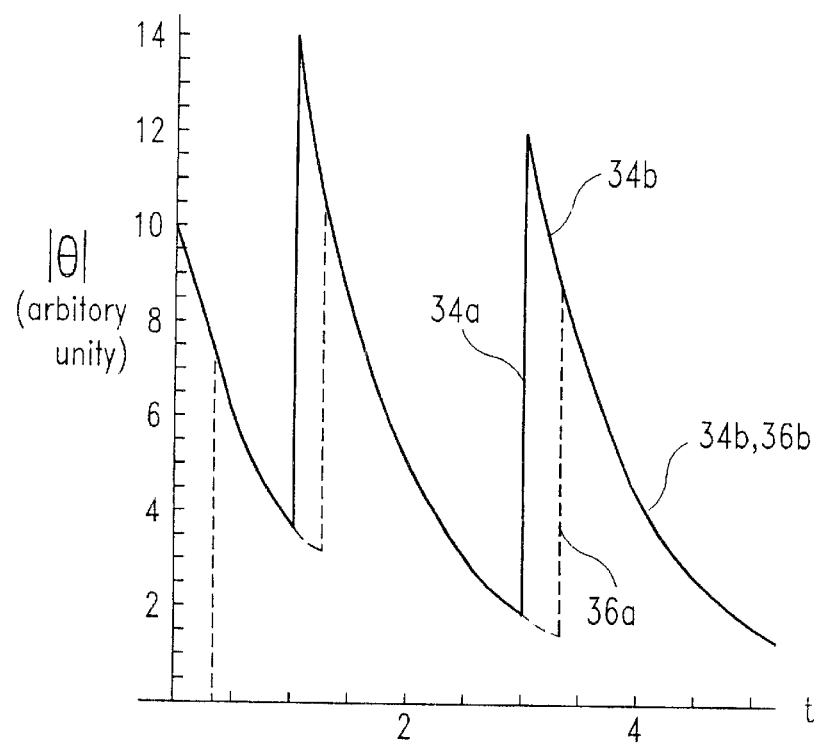
FIG. 6a is a graph showing pairs of fast rotations and slow relaxations provided by current pulses in a modulator of the present invention.
Figure 6B:
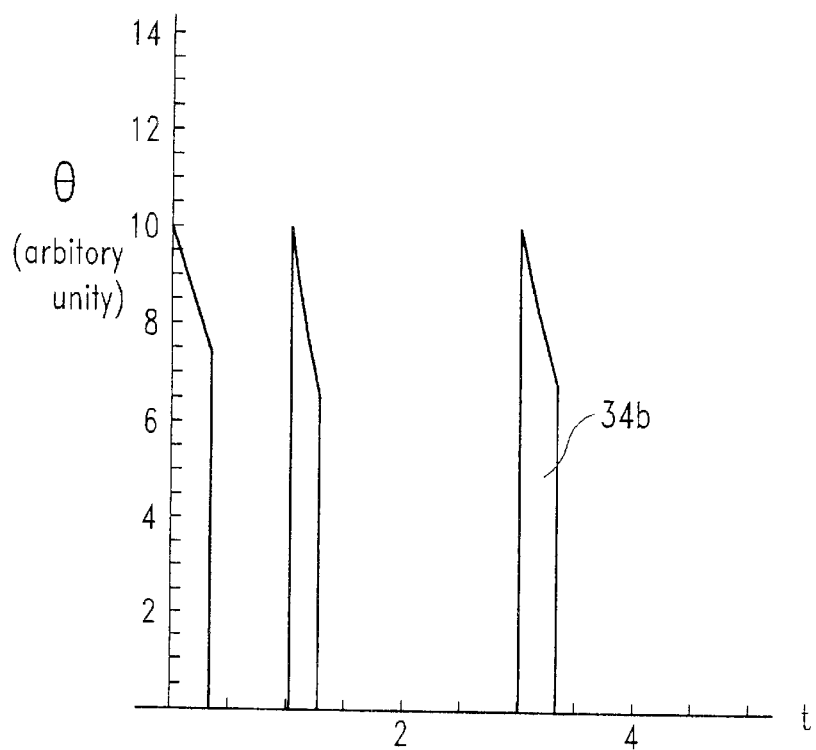
FIG. 6b is a graph showing a group of light pulses resulting from a linear combination of several pairs of rotations.
Figure 7A:
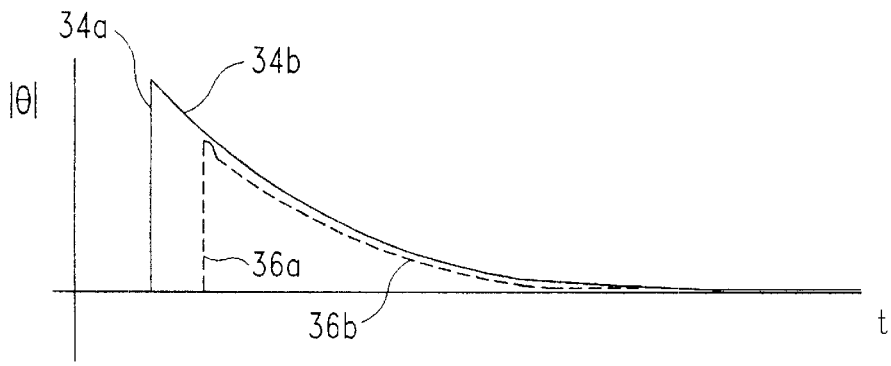
FIGS. 7a and 7b are graphs showing the effect of a small amount of non-overlap of a pair of slow relaxations to produce a noise signal.
Figure 7B:
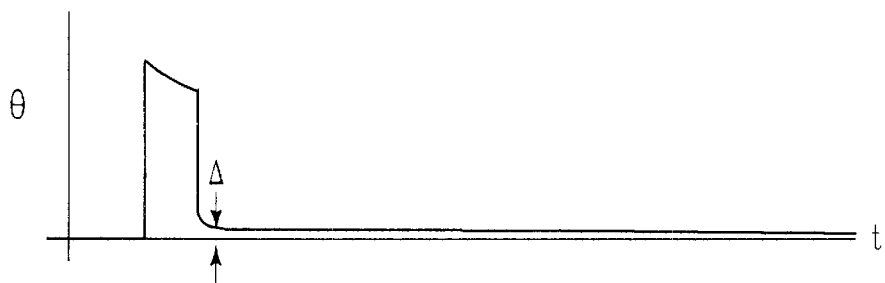
Figure 7C:
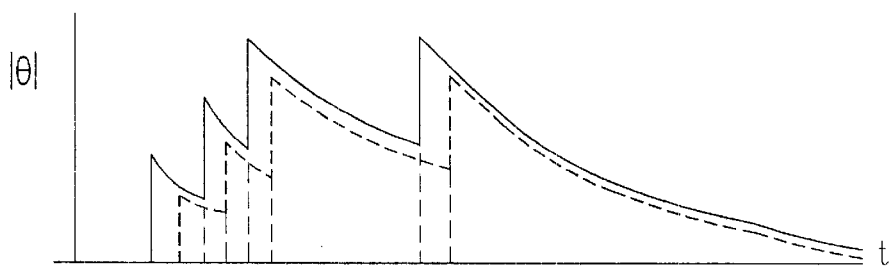
FIGS. 7c and 7d are graphs showing a group of light pulses and noise signals resulting from a linear combination of several pairs of rotations that do not completely overlap.
Figure 7D:
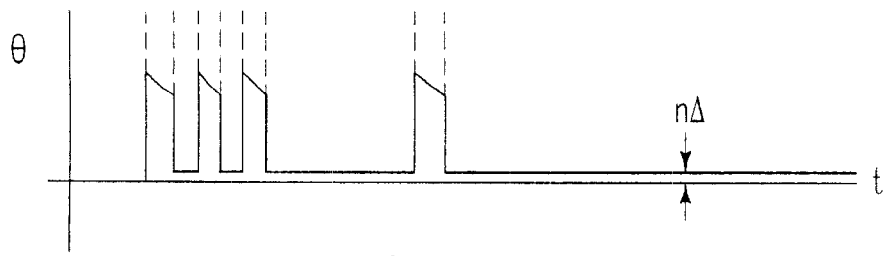

A closely spaced sequence of such rapid pulses can provide a digital signal at very high data rate as shown in FIGS. 6a–6b, which shows data produced by a modulator of the present invention in which many bits of data fit into the time for relaxation of the magneto-optical material. Pairs of excitation stimulations are provided, as shown in FIG. 6a. Portions of one part of each pair cancel corresponding portions of the other of that pair to provide discrete pulses, as shown in FIG. 6b. Thus, in the invention, the two rapid stimulations provide much shorter pulses, much higher speed modulation, and higher data rate than can be obtained by providing the first stimulation and then waiting for the material to relax at its natural relaxation time. The cancellation of one slow relaxation by the other works because both relaxations are well behaved curves, typically exponential, and both follow along identical tracks.

To the extent two relaxation curves 34b, 36b have different amplitudes at time $t_{BI}$ there is a noise signal $\Delta$, and this noise signal limits the number of pulses n that can be provided during one decay time as shown in FIGS. 7a–7d. The maximum noise from a series of n stimulations and relaxations, $n\Delta$, is to be kept substantially below the amplitude of a single pulse to maintain signal integrity, and this provides a limit on the number of stimulations that can be provided during the time of single relaxation. The best signal to noise ratio and the largest number of pulses during a relaxation time is achieved by arranging stimulations so that the amount of curve non-overlap is a small fraction of the amplitude of a single pulse.

Magneto-optical waveguide 24 is formed of a material that is stimulated by current pulse $30_A$ traveling through electrical conductor 32, as described herein above. Electrical conductor 32 can be a superconductor to provide electrical signals at high data rate over the short distance between pulse generator 35 and magneto-optical waveguide 24.

Figure 8:
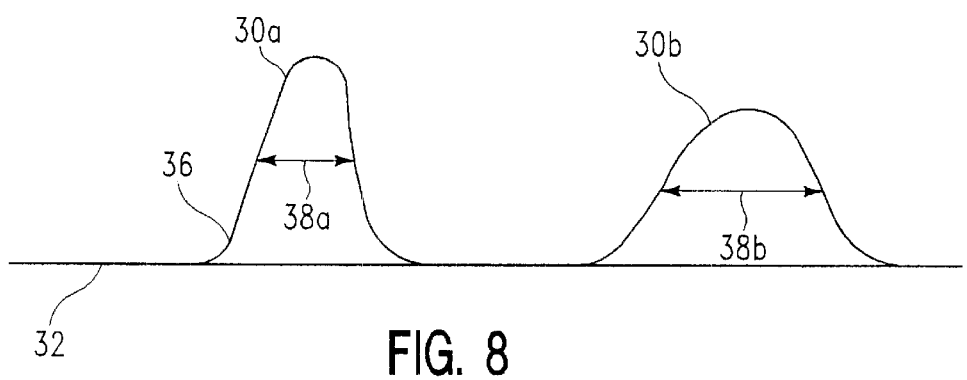
FIG. 8 shows dispersion of a current pulse as it travels in a conductor.

The shape of light pulse 42 is mostly affected by amplitude and slope of leading edge 36 of stimulating current pulse $30_A$, $30_B$ and by the amount of dispersion of the current pulse, as shown in FIG. 8. Obtaining optical pulses with steeply sloping leading and trailing edges requires that electrical pulses $30_A$, $30_B$ have high amplitude, steeply sloping leading edge 36, and experience little dispersion. Dispersion is schematically illustrated in FIG. 8 as current pulse broadening 38a to 38b as current pulse $30_A$ travels along electrical conductor 32 from pulse generator 35 toward wave guide 24, and then continues in U-shaped electrical conductor 32 to re-cross wave guide 24 in the opposite direction. Along with the slow relaxation, trailing features of first current pulse $30_A$ are cancelled out because second current pulse $30_B$ has a shape that is identical to that of first current pulse $30_A$ and produces a rotation curve 36 having a shape comparable to first rotation curve 34.

Magnetic field lines $44_A$, $44_B$ provided by current pulses $30_A$, $30_B$ along electrical conductor 32 are either parallel or anti-parallel to the propagation vector of light wave 20 that is being modulated by magneto-optical material 24. Pulse generator 35 may include Josephson junction technology to provide high speed current pulses $30_A$. CMOS or InP at low temperature, SiGe, and GaAs technologies can also provide high speed current pulses.

Dispersion depends on resistance in a conductor, and resistance increases with signal frequency. Short current pulses $30_A$, $30_B$ have high frequency. A superconductor operating at low temperature is particularly desirable to provide electrical conductor 32 carrying current pulse $30_A$, $30_B$ with low resistance and low dispersion for providing magnetic fields $H_A$, $H_B$. A superconductor can provide the required pulse characteristics of high amplitude, steeply sloping leading edge 36, and low broadening 38a to 38b. Current pulse widths of less than 1 ps have been demonstrated with superconductor, as described in a paper "Experiments and Simulations of Subpicosecond SFQ Propagation in Y—Ba—Cu—O Josephson Transmission Lines," R. Adam, et al, Proceedings of the Applied Superconductivity Conference, Sep. 17–22, 2000, Virginia Beach, Va. Pulses at lower data rate may be provided along ordinary copper, aluminum or gold wire.

The angle of Faraday rotation $\theta_A$ of polarization 22 produced in light traveling through a magneto-optical material is given by:

$$\theta_A = VBL$$

where V is the Verdet coefficient (an intrinsic material property), B is the magnitude of the magnetic field within the material and L is the distance the light wave travels within the magneto-optical material and within the magnetic field. The material can be thought of as having a circular birefringence having a magnitude that depends on magnetic field. The sense of rotation of the plane of polarization experienced by a wave traveling in the material is dependent on the direction of the magnetic field within the material in relation to the direction of propagation of the wave. When the projection of the magnetic field vector onto the propagation vector is parallel to the propagation vector one sense of rotation is observed. When anti-parallel, the opposite sense of rotation is observed.

The Verdet constant of magneto-optical materials increases with shorter wavelength and lower temperature. For example, the CRC handbook on page 12–162 shows a two order of magnitude increase in Verdet constant as temperature goes from 300K down to 1.45K for $Tb_2Al_5O_{12}$. Thus, to provide largest rotation of the plane of polarization for a given current pulse it is best to use short wavelength light and hold the magneto-optical material at low temperature.

Magnitude of optical pulse can also be increased by providing a higher magnetic field by providing a higher current. Thus, a superconducting wire capable of carrying a high current and that provides low resistance even at high frequency is desirable. Materials, such as yttrium barium cuprates, bismuth cuprates, thallium cuprates, mercury cuprates, and other well known high temperature superconductors can be used as the superconducting wire. Low temperature superconductors, such as niobium and tin can also be used.

Magnitude of optical pulse can also be increased by methods as described in the application Ser. No. 09/796,025, filed on the same day as this application and incorporated herein by reference.

The Sobolewski paper provides data showing a 4.52° rotation of the polarization of light in a EuSe magneto-optical wave guide produced by a 2.51 Oe magnetic field provided by a current pulse of 1 mA flowing in a superconducting Nb-trilayer and produced by a Josephson junction.

The fraction of optical power T transmitted through a polarizer having a polarization rotated through an angle $\theta_A$ with respect to the angle for blocking light is equal to $$T = \sin^2 \theta_A$$

Thus, for the 4.52° rotation found by Sobolewski, the power transmitted is 0.6% of the power incident on the polarizer. The rotation angle and the power transmitted can be increased by providing a higher current pulse $30_A$, longer interaction length L, or by adjusting temperature, material, or wavelength to provide a higher Verdet constant V.

The rotation angle and power transmitted can also be increased by providing multiple pairs of conductors for carrying multiple pairs of current pulses across the magneto optical material timed to provide additional boosts to the rotation angle of light passing there through, as described in a patent application Ser. No. 09/796,025 filed the same day as this application incorporated herein by reference.

In any case, light wave 20 is divided into three regions: first region 20a of light wave 20 experiences none of the rotations and does not penetrate through polarizer 26, as shown in FIG. 5c. Second region 20b experiences one of the rotations and some of this light can penetrate through polarizer 26. Finally, third region 20c experiences a linear combination of both rotations and this double rotation moves the plane of polarization back to the initial direction so no light can penetrate through polarizer 26. Thus, only a narrow pulse of radiation defined by two rapid excitations penetrates polarizer 26.

Oppositely directed magnetic fields $44_A$, $44_B$ around conductor 32 can be provided by providing electrical conductor 32 in a U shape to cross magneto-optical material 24 in two regions $24_A$, $24_B$. Current pulse $30_A$ crosses magneto-optical material in one direction in region $24_A$ and current pulse $30_B$ crosses in a direction opposite the direction of current pulse $30_A$ in region $24_B$, as shown in FIG. 3a, providing oppositely directed magnetic fields, $44_A$, $44_B$ and oppositely directed rapid magnetic stimulations $H_A$ of first region $24_A$ and $H_B$ of second region $24_B$ of magneto-optical material 24. In this embodiment a single current pulse in single electrical conductor 32 is thereby used twice to provide pulses $30_A$, $30_B$. Thus, a single current pulse provides both stimulations to define optical pulse 42 that emerges from polarizer 26. In this embodiment, the time for current pulse $30_A$, $30_B$ to travel along the U-shaped region of electrical conductor 32, less the time for light to travel between points in waveguide 24 crossed by conductor 32, is the time for optical pulse 42.

Light wave 20 with both rotations is excluded by polarizing filter 26. As before, that small portion of light wave 20 experiencing only first rotation 22' penetrates polarization filter 26 and this transmitted light becomes optical pulse 42, as shown schematically in FIG. 3a and graphically in FIG. 5c.

Figure 9A:
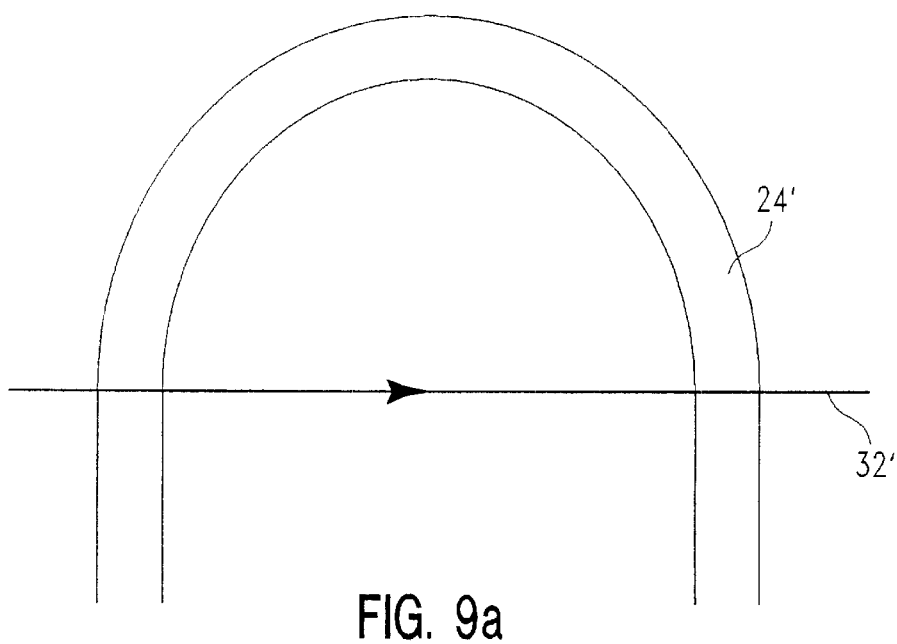
FIGS. 9a and 9b show alternate arrangements of electrical conductor and waveguide while still providing two crossing points.
Figure 9B:
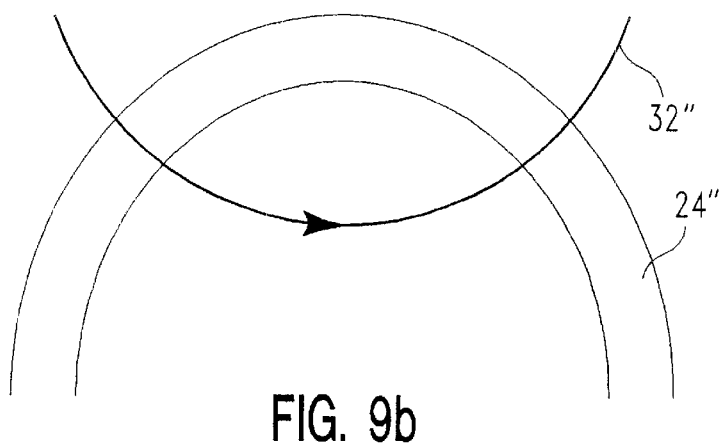

In one alternative, electrical conductor 32' can be straight while magneto-optical material 24' bends in a U shape, as shown in FIG. 9a. Or both electrical conductor 32" and waveguide 24" can bend, as shown in FIG. 9b.

Figure 10A:
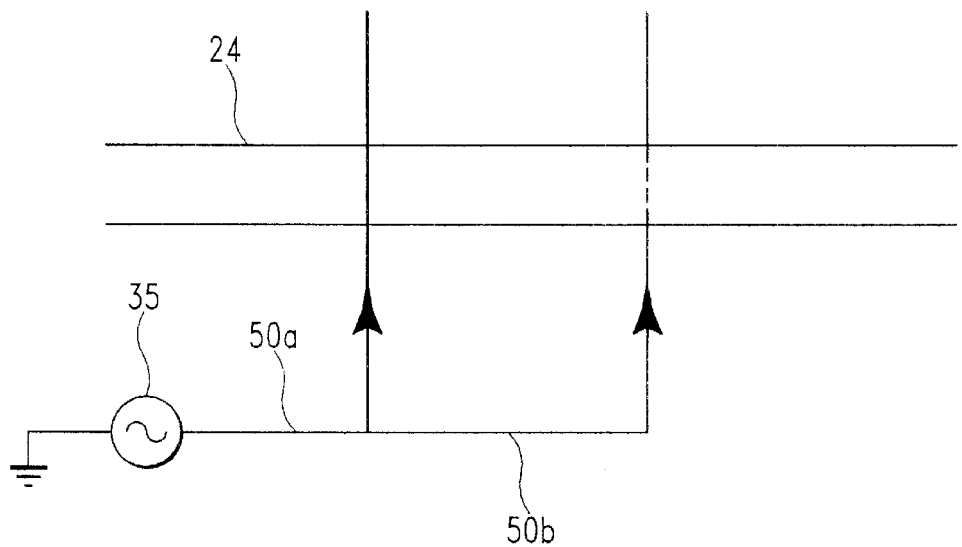
FIGS. 10a and 10b show alternate arrangements of electrical conductor, waveguide and current pulse generator.
Figure 10B:
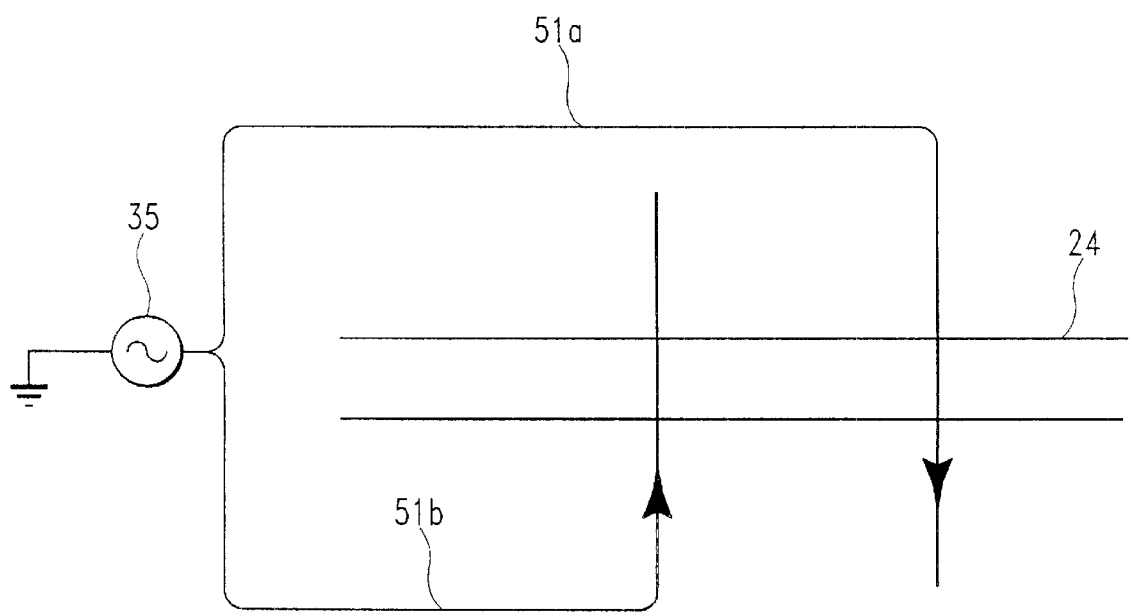

In yet another alternative, two current pulses from the same generator can be provided in the same direction across magneto-optical material 24 to provide the same effect if one electrical conductor is located above and the other below magneto-optical material 24, as shown in FIG. 10a. Time delay to set the length of optical pulse 42 can be provided by adjusting the relative length of electrical conductors 50a, 50b between generator 35 and magneto-optical material 24. Separate current pulse generators can also be used, and in this case optical pulse width is also determined by the separation in time between the current pulses at magneto-optical material 24. A similar result is obtained by providing current pulses in electrical conductors 51a, 51b extending in opposite directions from pulse generator 35, as shown in FIG. 10b.

Figure 11B:
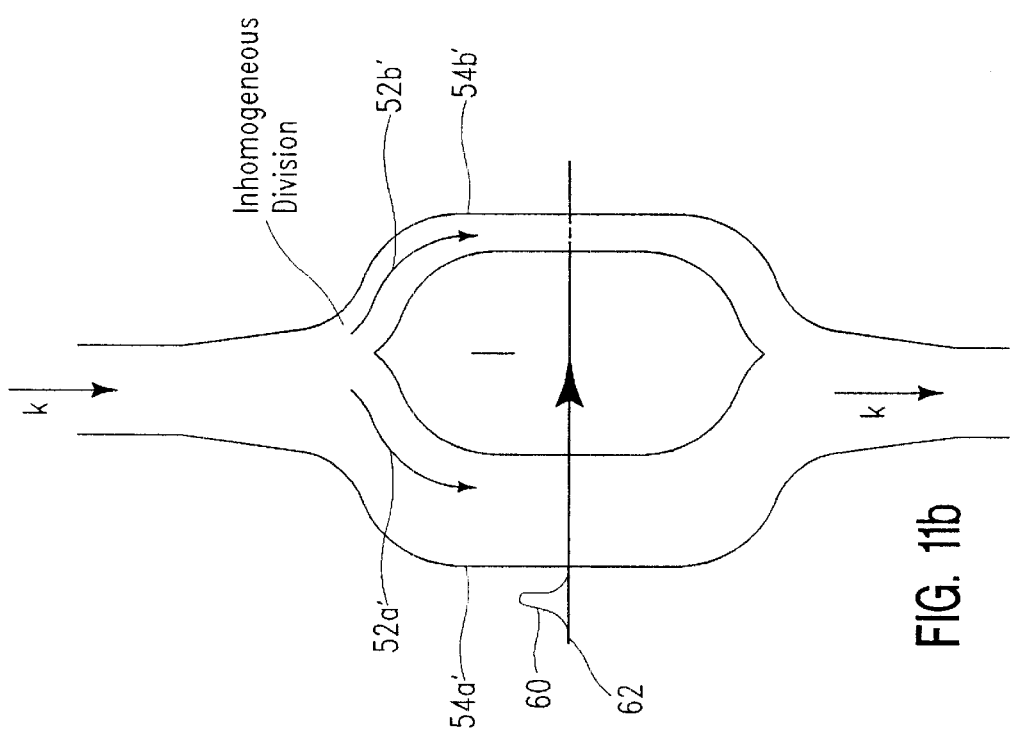
FIG. 11b shows another split waveguide that provides inhomogeneous division of the wave.
Figure 11A:
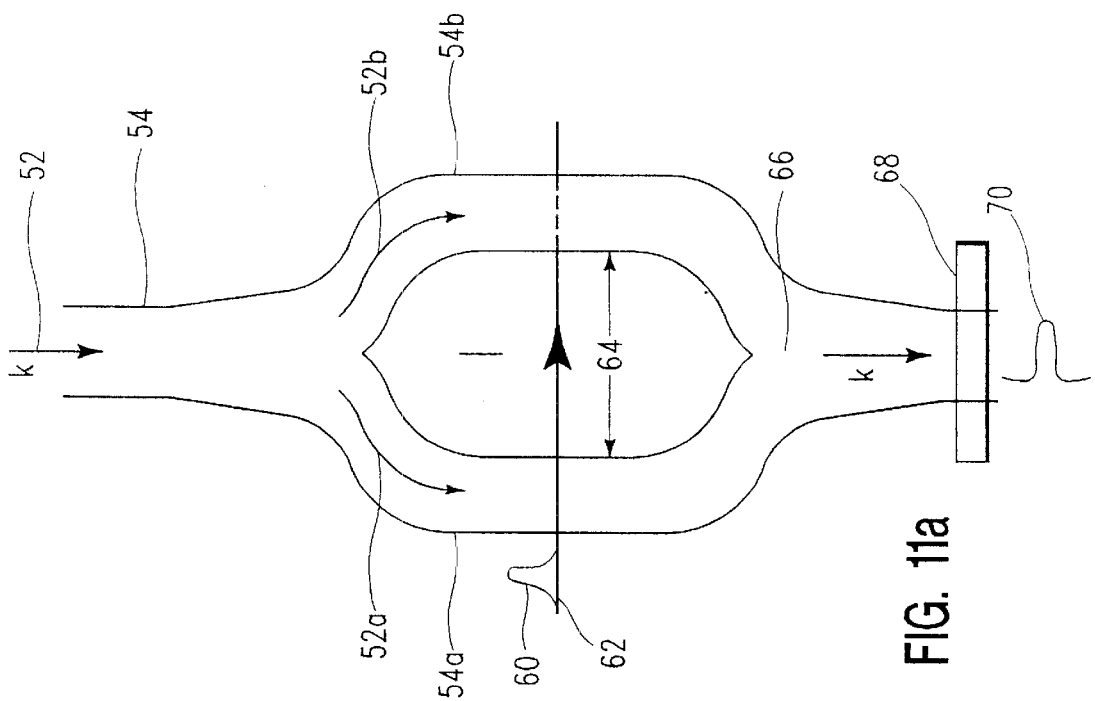
FIG. 11a shows a split waveguide and an alternate arrangement for providing the two stimulations of the present invention.

Just as an optical pulse can be obtained from a linear combination of rotations of light wave 20 in sequence, as shown in FIGS. 3, 9a–9b, 10a–10b, an optical pulse can also be obtained from a linear combination of rotations of polarizations of two waves traveling in different paths which combine, as shown in FIG. 11a.

Continuous light wave 52 traveling along Mach-Zehnder interferometer 54 is divided into light waves 52a, 52b in two magneto-optical material paths, 54a, 54b. Current pulse 60 traveling in electrical conductor 62 crosses over path 54a some time before crossing under path 54b. Current pulse 60 stimulates a rapid change in magnetic field in magneto-optical waveguide 54a slightly before stimulating a second rapid but opposite change in magnetic field in magneto-optical waveguide 54b. These two equal but opposite changes in magnetic field in waveguides 54a, 54b cause rotations of light waves 52a, 52b through equal angles but in opposite directions. Light wave 52a traveling in one of the two paths 54a of waveguide 54 has its plane of polarization rotated through angle $\theta_B$ in one direction while a short time later light wave 52b traveling in other path 54b has its plane of polarization rotated through angle $-\theta_B$ in the opposite direction.

Thus, the arrangement shown in FIG. 11a provides a time delay because of the time for current pulse 60 to travel across space 64 between two paths 54a, 54b of waveguide 54. Light with rotation from path 54a reaches intersection 66 before any light with counter rotation from path 54b reaches intersection 66. Polarizer 68 is adjusted to exclude initial continuous light wave 52. Polarizer 68 will also exclude light that includes a linear combination of contributions of oppositely rotated light from both paths 54a, 54b when light from path 54b reaches intersection 66. Only during the brief interval of time for current pulse 60 to travel distance 64 between paths 54a, 54b when light having rotation $\theta_B$ from path 54a reaches intersection 66 and before light having counter rotation $-\theta_B$ from path 54b reaches intersection 66 does light pulse 70 penetrate polarizer 68, and this interval of time defines light pulse 70. Thus, two fast excitations in two parallel paths mask the slow time-varying relaxation of magneto-optical material in waveguides 54a, 54b. In addition, pulse of light 70 is again defined by amplitude, leading edge, and dispersion of fast excitation current pulse 60.

For more precise cancellation of polarizations along the two paths, intensity matching of delayed pulse with earlier pulse can be provided, for example, by providing unequal division of initial continuous light 52 by providing path 54a' wider than path 54b', as shown in FIG. 11b. Since some relaxation occurs during the time before the second stimulation, a decrease in intensity is provided so the initial second signal in path 54b' matches the intensity of the partially relaxed first signal in path 54a'.

Alternatively, optical path can be longer in one arm 54a, to provide interference where light waves 52a, 52b recombine (see FIG. 12). In this case polarizer 68 is not needed.

An interferometer can be used in all embodiments described herein above instead of polarizer 26 to exclude light having polarization pointing in initial direction $\theta_o$, as shown in FIG. 12. Interferometer 70 includes beam splitter 72 that directs half of polarized light wave 20 from polarizer 21 into each of two arms. First arm 74 has magneto-optical material 24 and electrical conductor 32, as illustrated in FIG. 3a and described herein above. Second arm 76 includes a longer or shorter optical path, such as provided by phase delay plate 78, to provide a 180 degree phase shift to the portion of light wave 20 traveling this path. Where they recombine at beam splitter 80, light traversing the two arms are out of phase and interfere destructively. Thus, the output of interferometer 70 is normally dark, just as unrotated light is unable to pass through polarizer 26 in FIG. 3a. However, when the portion of light wave 20 traveling through magneto-optical material 24 has its polarization rotated, there will no longer be destructive interference and signal will emerge at beam splitter 80. Interferometer 70 provides advantage in that absorption by polarizer 26 is avoided so more light is transmitted.

Figure 13A:
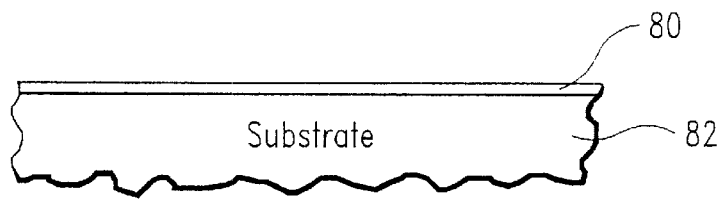
FIGS. 13a–13c and 13e–13h show cross sectional views of steps in fabrication of the present invention.
Figure 13B:
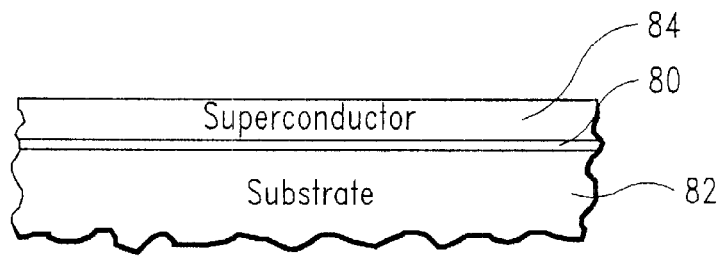
Figure 13C:
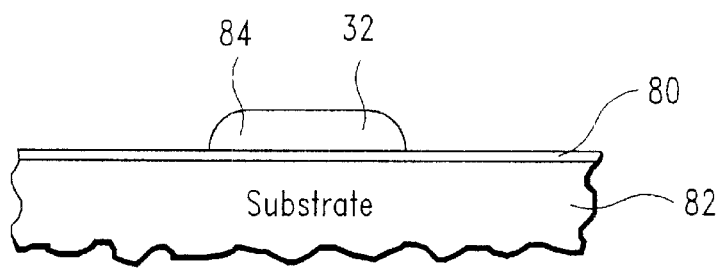
Figure 13D:
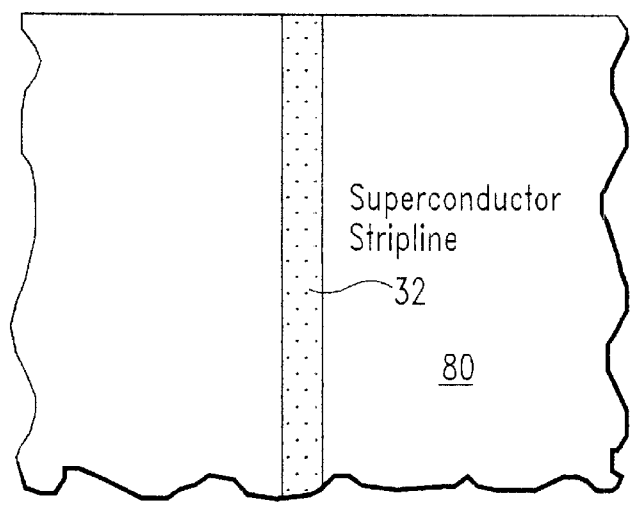
FIGS. 13d and 13i show top views of steps in fabrication of the present invention.

The layered structure of the present invention is fabricated using techniques common to integrated circuit manufacture. In one embodiment of the process, about a 500-Angstrom thick layer of Yttrium Stabilized Zirconium (YSZ) 80 is deposited on about a 500 micrometer thick silicon substrate 82, as shown in FIG. 13a. Approximately 1000 Angstroms of yttrium barium copper oxide (YBCO) superconductor 84 is then deposited on YSZ layer 80, as shown in FIG. 13b. Using standard photolithography and etch techniques, about a 20 micrometer wide microstripline or electrical conductor 32 is formed from YBCO superconductor 84, as shown in FIGS. 13c and 13d to carry current pulses $30_A$, $30_B$. Other superconductors can be used, Alternatively, other superconducting materials, as described herein above, and other substrates such as lanthanum aluminate, strontium titanate, magnesium oxide, can be used.

Figure 13E:
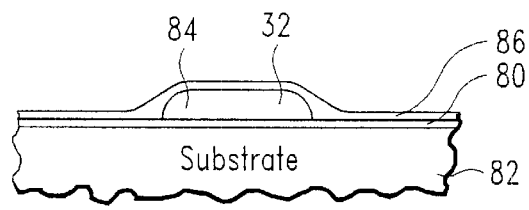
Figure 13F:
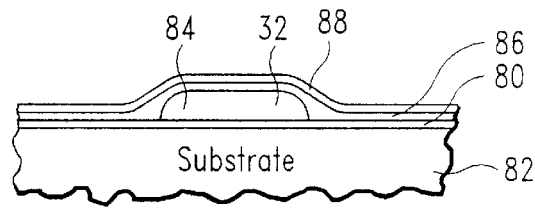
Figure 13G:
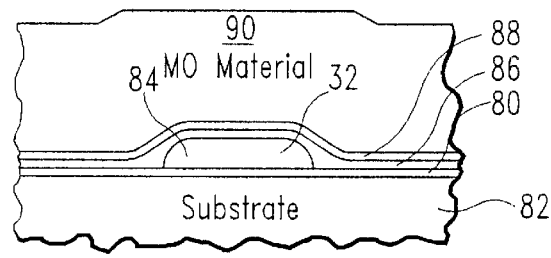
Figure 13H:
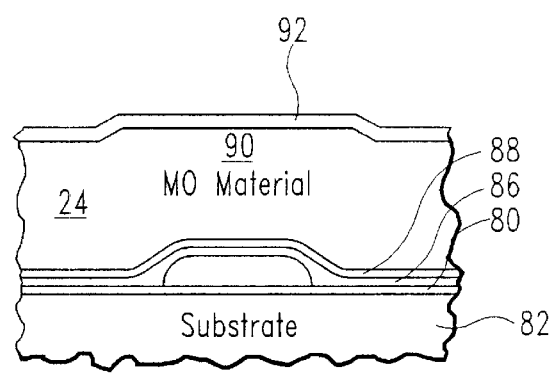
Figure 13I:
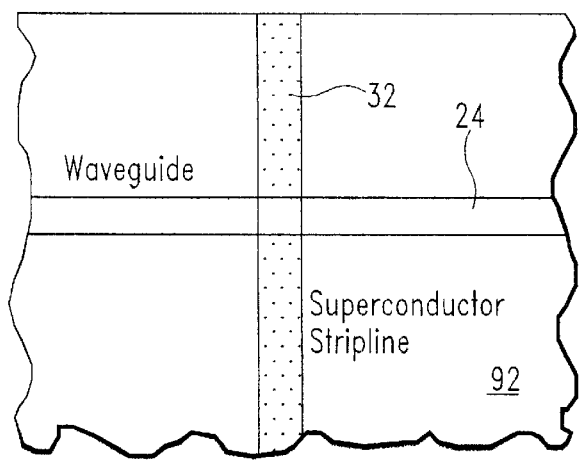

In the next step about 500 Angstroms of YSZ 86 and then about 500 Angstroms of silicon nitride 88 is deposited, as shown in FIGS. 13e, 13f. YSZ is a good diffusion barrier to silicon. Nitride is a good barrier to water and other ionics. Next, about 5 microns of magneto-optical material 90, such as EuSe is deposited and etched to form wave guide 24, as shown in cross sectional view in FIG. 13g and in top view in FIG. 13i, so that waveguide 24 is crossing over superconducting electrical conductor 32. Finally, about a 5000 Angstrom thick layer of gold 92 is deposited over the entire surface to act as a ground plane, as shown in FIGS. 13h. Although not shown in FIG. 13d, superconducting wire or magneto-optical waveguide can be formed in a U shape or other shape described herein above to provide the double stimulation to magneto-optical material 90 as provided in the present invention.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of generating a pulse of radiation, comprising the steps of:
    a) directing incident radiation through a material, said radiation having a first parameter;
    b) providing a first stimulation to a first region of said material to excite a first population of said material into a first excited state, wherein said material has a time for excitation and a time for relaxation after said excitation; and
    c) generating a pulse of radiation in said material from said incident radiation, wherein said pulse is shorter in time than said time for excitation plus said time for relaxation.

2. The method as recited in claim 1, wherein said time for relaxation is longer than said time for excitation.

3. The method as recited in claim 2, wherein in said providing step (b) said radiation traveling through said first region stimulated in said first excited state has said first parameter changed by a first amount due to said first stimulation, and wherein said generating step (c) comprises the step of providing a second stimulation to a second region of said material to excite a second population of said material into a second excited state wherein radiation traveling through said second region stimulated in said second excited state has said first parameter changed by a second amount due to said second stimulation.

4. The method as recited in claim 3, wherein said radiation traveling through said first region stimulated in said first excited state and radiation traveling through said second region stimulated in said second excited state are combined such that said first parameter of said combined radiation comprises a linear combination of said first amount and said second amount.

5. The method as recited in claim 4, wherein said linear combination of said first amount and said second amount provides said first parameter with a value approximately equivalent to that of said incident radiation.

6. The method as recited in claim 5, wherein said second amount is opposite said first amount.

7. The method as recited in claim 3, wherein said first region of said material is in a first leg of a Mach-Zehnder interferometer and said second region of said material is in a second leg of said Mach-Zehnder interferometer.

8. The method as recited in claim 3, wherein said first region of said material is in line with said second region of said material, wherein radiation traveling through said first region stimulated in said first excited state also travels through said second region stimulated in said second excited state.

9. The method as recited in claim 3, wherein said pulse of radiation comprises a first part and a second part, said first part comprising radiation traveling through said first region stimulated in said first excited state but not through said second region stimulated in said second excited state, and wherein said second part comprises radiation traveling through said first region stimulated in said first excited state and radiation traveling through said second region stimulated in said second excited state.

10. The method as recited in claim 3, wherein said first parameter comprises polarization, wherein said incident radiation has an incident polarization in an incident polarization direction, and wherein said incident radiation traveling through said first region stimulated in said first excited state has said incident polarization rotated a first amount in a first direction and wherein said radiation traveling through said second region stimulated in said second excited state has its polarization rotated a second amount in a second direction opposite said first direction, wherein said second part comprises radiation having a polarization rotated back to said incident polarization direction.

11. A method as recited in claim 10, wherein said second amount is about equal to said first amount.

12. A method as recited in claim 10, further comprising the step of stopping transmission of a wave having a polarization oriented in said incident polarization direction.

13. A method as recited in claim 12, wherein said transmission is stopped using a polarizer or an interferometer.

14. A method as recited in claim 1, wherein said material comprises a magneto-optic material and wherein said first stimulation comprises a first magnetic pulse.

15. A method as recited in claim 14, wherein said first magnetic pulse is provided by a current pulse in a first electrical conductor.

16. A method as recited in claim 15, wherein said first electrical conductor comprises a superconductor.

17. A method as recited in claim 15, wherein said second stimulation comprises a second magnetic pulse, wherein said current pulse in said first electrical conductor further provides said second magnetic pulse.

18. The method as recited in claim 17, wherein said second magnetic pulse has a smaller magnitude in said material than said first magnetic pulse.

19. The method as recited in claim 18, wherein said first electrical conductor is spaced more distantly from said second region than it is spaced from said first region.

20. The method as recited in claim 18, further comprising a current divider to adjust magnitude of said second current pulse.

21. The method as recited in claim 20, wherein said current divider comprises a pair of superconductors arranged in parallel, wherein said current pulse has a frequency sufficient to provide resistance for each path in said superconductors for dividing said current.

22. A method as recited in claim 17, wherein said first electrical conductor crosses said magneto-optic material at a first point and at a second point.

23. A method as recited in claim 22, wherein said pulse of radiation has a pulse width, and wherein said pulse width is determined by the difference in time for light to travel between said first point and said second point and time for said current pulse to travel between said first point and said second point.

24. A method as recited in claim 22, wherein said material is shaped with a U shape and said first electrical conductor crosses said U shape.

25. A method as recited in claim 22, wherein said first electrical conductor is shaped with a U shape.

26. A method as recited in claim 15, wherein said first region of said material is in a first leg of a Mach-Zehnder interferometer and said second region of said material is in a second leg of said Mach-Zehnder interferometer.

27. A method as recited in claim 26, wherein said first current pulse is directed over said first leg of said Mach-Zehnder interferometer and under said second leg.

28. A method as recited in claim 15, wherein said second stimulation comprises a second magnetic pulse, wherein said second magnetic pulse is provided by a second current pulse in a second electrical conductor, wherein said first electrical conductor intersects said material at a first point and said second electrical conductor intersects said material at a second point.

29. The method as recited in claim 14, wherein said magneto-optical material has a more rapid excitation to said first excitation mode and to said second excitation mode than relaxation from said first excitation mode and from said second excitation mode.

30. The method as recited in claim 14, wherein said second stimulation is provided by a second magnetic pulse provided a specified time after said first magnetic pulse.

31. The method as recited in claim 14, wherein said second stimulation is provided by a second magnetic pulse provided at the same time as said first magnetic pulse but in a different region of said material.

32. The method as recited in claim 14, wherein said incident radiation is directed to travel in a first direction in said magneto optical material, wherein said second region is along said first direction from said first region.

33. The method as recited in claim 14, wherein said incident radiation is divided into two paths and said pulse comprises contributions from said two paths.

34. The method as recited in claim 14, wherein said magneto-optical material comprises a member from the group consisting of Cd, Mn, Se, Eu, 0, S, Bi, C, K, Mg, Al, Br, Te, Cr, Fe, Ba, Y, Gd, Ga, I, Cl, Ni, Rb, Zn, Rh, Co, and Li.

35. The method as recited in claim 1, wherein said incident radiation is a continuous optical wave.

36. The method as recited in claim 1, wherein said first stimulation comprises an interband effect, excitonic effect, free-carrier effect, or impurity magnetoabsorption effect.

37. The method as recited in claim 1, further comprising the step of generating a train of said pulses, wherein said pulses are separated by a time less than said time for excitation plus said time for relaxation.

38. The method as recited in claim 37, wherein said train of pulses has a rate of 100 GHz or higher.

39. The method as recited in claim 38, wherein said train of pulses has a rate of 1000 GHz or higher.

40. The method as recited in claim 1, wherein said incident radiation comprises said first parameter having a first value and wherein said radiation pulse comprises radiation having said first parameter different from said first value.

41. A device, comprising an electrical conductor and a magneto-optical material, wherein said electrical conductor crosses said magneto-optical material in a first location and in a second location, wherein said electrical conductor is positioned to provide a first current pulse stimulating a first excitation of a first population of said magneto-optical material at said first location and said electrical conductor is positioned to provide a second current pulse stimulating a second excitation of a second population of said magneto-optical material at said second location, wherein said electrical conductor and said magneto-optical material are configured to provide said second excitation of said second population to be opposite said first excitation of said first population.

42. The device as recited in claim 41, wherein said electrical conductor comprises a superconductor.

43. The device as recited in claim 41, further comprising a source of a current pulse, said electrical conductor connected to said source of current pulse.

44. The device as recited in claim 41, further comprising a source of light for directing through said magneto-optical material.

45. The device as recited in claim 44, wherein said source of light provides a continuous wave.

46. The device as recited in claim 44, wherein said second location is positioned so a first segment of a light wave traveling through said magneto-optical material experiences only effect of said first excitation and a second segment of said wave experiences effect of both said first excitation and said second excitation.

47. The device as recited in claim 41, further comprising a polarizer.

48. The device as recited in claim 47, wherein said polarizer is adjusted to prevent transmission of light when no current flows in said electrical conductor.

49. The device as recited in claim 41, wherein said magneto-optical material provides a single path for a light wave and said electrical conductor intersects said single path in two locations.

50. The device as recited in claim 41, wherein said magneto-optical material provides two paths for a light wave and said electrical conductor intersects each of said two paths.

51. A circuit, comprising a first superconductor, a second superconductor, and a source of a high frequency electrical signal, said source having a frequency sufficient to provide resistance in said first superconductor and in said second superconductor for dividing said signal according to said resistance in each said superconductor.

52. The circuit as recited in claim 51, wherein said first superconductor is arranged in parallel with said second superconductor, further wherein said electrical signal is a current signal, wherein said circuit divides said current according to said resistance in said first superconductor and said second superconductor.

53. A device comprising an electrical conductor and a means for generating a change in an optical parameter, wherein said electrical conductor crosses said means in a first location and in a second location, wherein said electrical conductor is positioned to provide a first current pulse providing a first stimulation to said means at said first location and said electrical conductor is positioned to provide a second current pulse providing a second stimulation at said second location, wherein said electrical conductor and said means are configured to provide said second stimulation opposite said first stimulation.

* * * * *